United States Patent
Lee et al.

(10) Patent No.: US 10,285,021 B2
(45) Date of Patent: May 7, 2019

(54) METHOD AND APPARATUS FOR TRANSMITTING/RECEIVING A MBSP MESSAGE IN A WIRELESS ACCESS SYSTEM

(71) Applicant: LG Electronics Inc., Seoul (KR)

(72) Inventors: Ki-Dong Lee, San Diego, CA (US); Sang Gook Kim, San Diego, CA (US)

(73) Assignee: LG Electronics Inc., Seoul (KR)

(*) Notice: Subject to any disclaimer, the term of this patent is extended or adjusted under 35 U.S.C. 154(b) by 111 days.

(21) Appl. No.: 15/328,294

(22) PCT Filed: Sep. 21, 2015

(86) PCT No.: PCT/KR2015/009877
§ 371 (c)(1),
(2) Date: Jan. 23, 2017

(87) PCT Pub. No.: WO2016/043567
PCT Pub. Date: Mar. 24, 2016

(65) Prior Publication Data
US 2017/0215047 A1    Jul. 27, 2017

Related U.S. Application Data

(60) Provisional application No. 62/053,028, filed on Sep. 19, 2014.

(51) Int. Cl.
*H04W 4/06* (2009.01)
*H04W 4/22* (2009.01)
(Continued)

(52) U.S. Cl.
CPC .......... *H04W 4/06* (2013.01); *H04L 12/1895* (2013.01); *H04W 4/90* (2018.02); *H04W 68/02* (2013.01);
(Continued)

(58) Field of Classification Search
None
See application file for complete search history.

(56) References Cited

U.S. PATENT DOCUMENTS

2008/0033805 A1* 2/2008 Padin .................... G06Q 30/02
705/14.64
2010/0026472 A1* 2/2010 Kitazoe ............... G08B 27/006
340/311.2
(Continued)

FOREIGN PATENT DOCUMENTS

| EP | 2683202 A2 | 1/2014 |
|---|---|---|
| WO | 2009/117366 A1 | 9/2009 |
| WO | 2014/053084 A1 | 4/2014 |

OTHER PUBLICATIONS

3GPP TR 22.968 V11.0.0, "Study for requirements for a Public Warning System (PWS) service (Release 11)", Sep. 21, 2012, pp. 23-24.

*Primary Examiner* — Duc T Duong
(74) *Attorney, Agent, or Firm* — Dentons US LLP

(57) ABSTRACT

The present invention relates to methods and apparatus for transmitting or receiving a Multimedia Broadcast Supplement for Public warning system (MBSP) message. One of the embodiments of the present invention, a method for receiving a multimedia broadcast supplement for public warning system (MBSP) message, the method performed by a user equipment (UE) and comprising: receiving a paging message including an MBSP indication field indicating an MBSP notification will be transmitted; receiving a system information block including the MBSP notification including an MBSP related information for allocating a resource for receiving the MBSP message; and receiving the MBSP message through the resource, wherein the MBSP message includes public safety multimedia information for warning a user of the UE.

10 Claims, 12 Drawing Sheets

(51) Int. Cl.
*H04W 4/90* (2018.01)
*H04W 68/02* (2009.01)
*H04L 12/18* (2006.01)
*H04W 4/12* (2009.01)
*H04W 76/50* (2018.01)

(52) U.S. Cl.
CPC ............ *H04L 12/189* (2013.01); *H04W 4/12* (2013.01); *H04W 76/50* (2018.02)

(56) References Cited

U.S. PATENT DOCUMENTS

| | | | |
|---|---|---|---|
| 2011/0002250 A1* | 1/2011 | Wang | H04W 76/40 370/311 |
| 2011/0188437 A1* | 8/2011 | Kitazoe | H04W 4/90 370/312 |
| 2011/0194477 A1 | 8/2011 | Damnjanovic et al. | |
| 2013/0219023 A1* | 8/2013 | Surianarayanan | G08B 27/005 709/219 |
| 2014/0134970 A1* | 5/2014 | Pazos | H04L 65/4069 455/404.1 |
| 2014/0150064 A1* | 5/2014 | Wifvesson | H04L 63/08 726/3 |
| 2014/0273910 A1* | 9/2014 | Ballantyne | H04W 4/22 455/404.1 |
| 2014/0370835 A1* | 12/2014 | Wu | H04W 4/90 455/404.1 |

* cited by examiner (a) Control-Plane Protocol Stack (b) User-Plane Protocol Stack

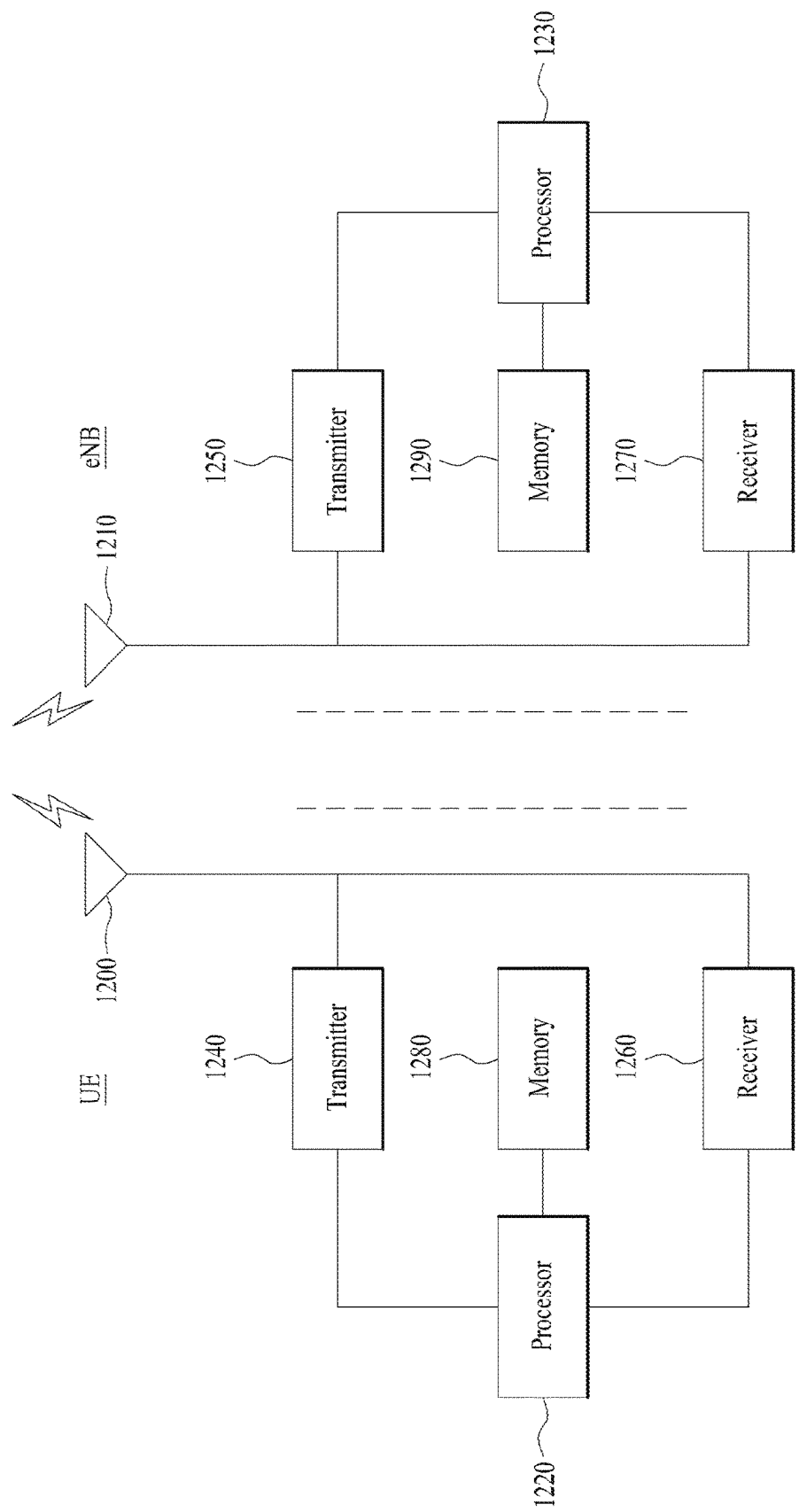

METHOD AND APPARATUS FOR TRANSMITTING/RECEIVING A MBSP MESSAGE IN A WIRELESS ACCESS SYSTEM

This application is a 35 USC § 371 National Stage entry of International Application No. PCT/KR2015/009877, filed on Sep. 21, 2015, and claims priority to U.S. Provisional Application No. 62/053,028, filed Sep. 19, 2014, which is hereby incorporated by reference in its entirety for all purposes as if fully set forth herein.

TECHNICAL FIELD

The present invention relates to a wireless access system, and more particularly, to methods and apparatus for transmitting or receiving a Multimedia Broadcast Supplement for Public warning system (MBSP) message.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

The work on Public Warning Systems (PWS) within the 3GPP (3rd Generation Partnership Project) systems has focused on delivering text-based warnings of limited content to the public at a large scale. This functionality is essential in providing a basic warning system with the elements as set out in clause 4.3 of 3GPP TS 22.268 document on PWS. It is noted in PWS that content which might trigger an increase in network load should be avoided as the network likely to be under stress, and capacity diminished depending upon the nature of the emergency.

DISCLOSURE

Technical Problem

Experience with the current PWS has led some public safety alerting agencies to have difficulties of trying to include all the essential public safety information needed to inform the public into the current PWS limited text message size. Some of this essential public safety information (i.e., multimedia information) includes maps with public safety mark-up, images of missing persons, live news video broadcasts, public safety information video broadcasts, evacuation information, latest safety briefings, weather warnings, emergency shelter locations, and assembly points etc. However, due to the limited size of the current PWS text message size, it is impossible to provide the multimedia information for the warning to UEs under the current PWS.

Accordingly, the present invention has been devised to solve the problems exist in the current wireless access systems and an object of the present invention is to provide methods for supporting the multimedia broadcast to supplement the current PWS.

Another object of the present invention is to provide scenarios and use cases where a public safety agency in executing its mission, needs to distribute on a large scale timely public safety information to the public where this public safety information significantly exceeds the current PWS basic message capacity.

Still another object of the present invention is to propose potential requirements for handling this dissemination via broadcast including the management of the public safety multimedia broadcast and the access to this broadcast public safety information by the users.

Technical problems to be solved by the present invention are not limited to the above-mentioned technical problem, and other technical problems not mentioned above can be clearly understood by one skilled in the art from the following description.

Technical Solution

The present invention relates to methods and apparatus for transmitting or receiving a Multimedia Broadcast Supplement for Public warning system (MBSP) message.

In one aspect of the present invention, a method for receiving a multimedia broadcast supplement for public warning system (MBSP) message, the method performed by a user equipment (UE) and comprising: receiving a paging message including an MBSP indication field indicating an MBSP notification will be transmitted; receiving a system information block (SIB) including the MBSP notification including an MBSP related information for allocating a resource for receiving the MBSP message; and receiving the MBSP message through the resource, wherein the MBSP message includes public safety multimedia information for warning a user of the UE.

The method may further comprise step of receiving a system information block including scheduling information list indicating when the system information block including the MBSP notification is to be received.

In another aspect of the present invention, a user equipment (UE) for receiving a multimedia broadcast supplement for public warning system (MBSP) message, the UE comprising: a receiver; and a processor functionally connected with the receiver for receiving the MBSP message. Wherein the processor is configured to control the receiver to receive a paging message including an MBSP indication field indicating an MBSP notification will be transmitted; receive a system information block including the MBSP notification including an MBSP related information for allocating a resource for receiving the MBSP message; and receive the MBSP message through the resource, wherein the MBSP message includes public safety multimedia information for warning a user of the UE.

The processor may further control the receiver to receive a system information block including scheduling information list indicating when the system information block including the MBSP notification is to be received.

The UE may be an MBSP capable UE and the paging message is only applicable to the MBSP capable UE.

The system information block may further include a second text message which is used for extending a size of a first text message of a legacy public warning system (PWS).

The system information block including the MBSP notification may be a system information block 11 which is used for transmitting an Earthquake and Tsunami Warning Service (ETWS) notification or a system information block 12 which is used for transmitting a Commercial Mobile Alert System (CMAS) notification as defined in 3GPP LTE and LTE-Advanced systems.

The above embodiments are part of preferred embodiments of the present invention. Obviously, it is to be understood to those having ordinary knowledge in the art that various embodiments having the technical features of the present invention can be implemented on the detailed description of the present invention as set forth herein.

Advantageous Effects

According to exemplary embodiments of the present invention, the following advantages can be obtained.

First of all, the present invention is able to provide methods for supporting the multimedia broadcast to supplement PWS.

Secondly, the present invention is able to provide scenarios and use cases where a public safety agency in executing its mission, needs to distribute on a large scale timely public safety information to the public where this public safety information significantly exceeds the current PWS basic message capacity.

Moreover, the present invention is able to fulfill potential requirements for handling this dissemination via broadcast including the management of the public safety multimedia broadcast and the access to this broadcast public safety information by the users.

Accordingly, it is evident that multimedia types of public safety information for PWS situation can be helped the potential affectees, victims, or public safety officers to prepare what to do next after receiving the MBSP message introduced by this present invention.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 12 shows apparatuses for implementing the above-mentioned methods described with reference to FIGS. 1 to 11.

MODE FOR INVENTION

Figure 1:
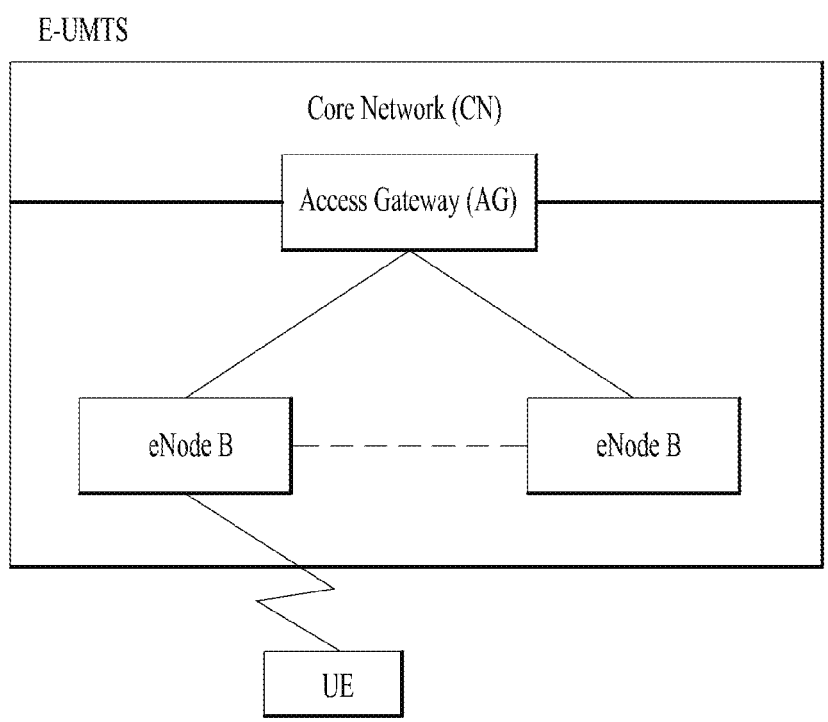
FIG. 1 illustrates a schematic structure a network structure of an evolved universal mobile telecommunication system (E-UMTS)

Exemplary embodiments of the present invention provide a method and apparatus for transmitting or receiving a Multimedia Broadcast Supplement for Public warning system (MBSP) message.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between a BS and a UE. A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an ABS (Advanced Base Station), an access point, etc.

The term UE may be replaced with the terms MS (Mobile Station), SS (Subscriber Station), MSS (Mobile Subscriber Station), AMS (Advanced Mobile Station), mobile terminal, etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an MS may serve as a transmitter and a BS may serve as a receiver, on uplink. Likewise, the MS may serve as a receiver and the BS may serve as a transmitter, on downlink.

The embodiments of the present invention are supported by standard documents disclosed for at least one of wireless access systems including IEEE 802.xx systems, a 3GPP system, a 3GPP LTE system, and a 3GPP2 system. In particular, the embodiments of the present invention are supported by 3GPP TS 22.815, 3GPP TS 22.268, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 8 to Release 11 of "3rd Generation Partnership Project; Technical Specification Group Radio Access Network".

Referring to FIG. 1, the E-UMTS mainly includes a User Equipment (UE), base stations (BSs, or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
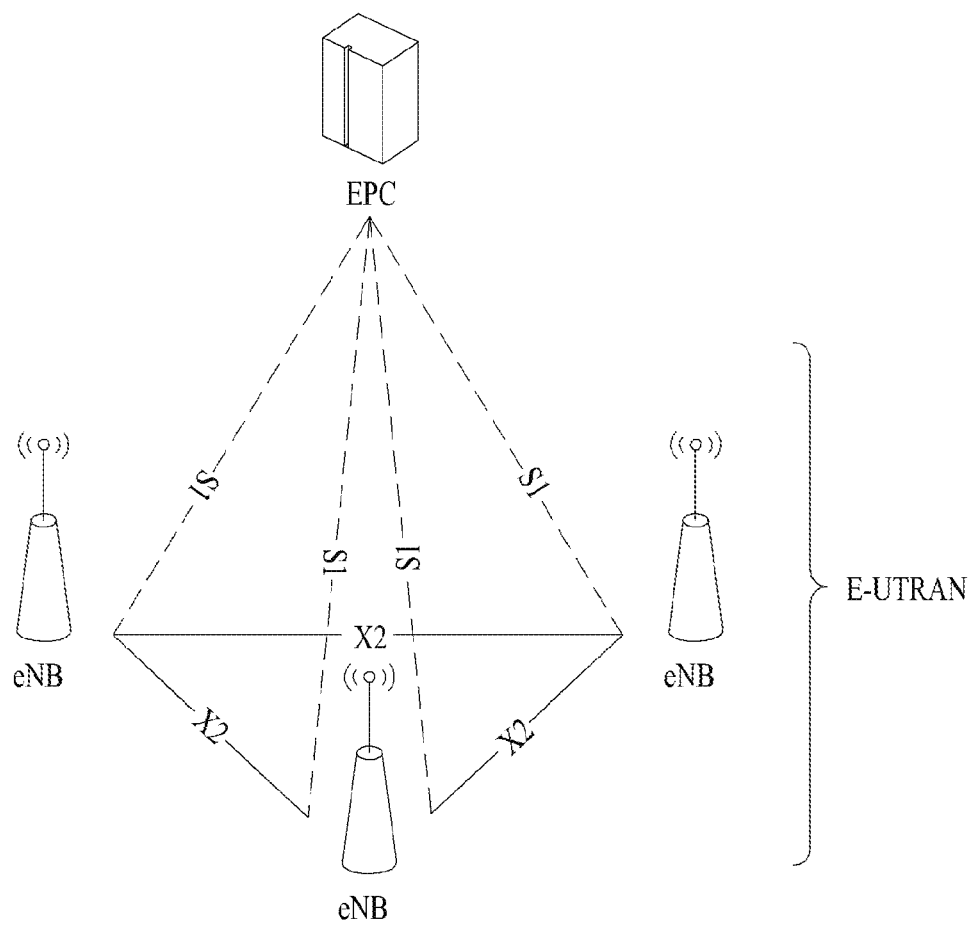
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes one or more base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (S1-MME) is defined between the eNB and the MME (Mobility Management Entity). The S1 interface performs following functions: EPS (Evolved Packet System) Bearer Service Management function, NAS (Non-Access Stratum) Signaling Transport function, Network Sharing Function, MME Load balancing Function and the like.

Figure 3:
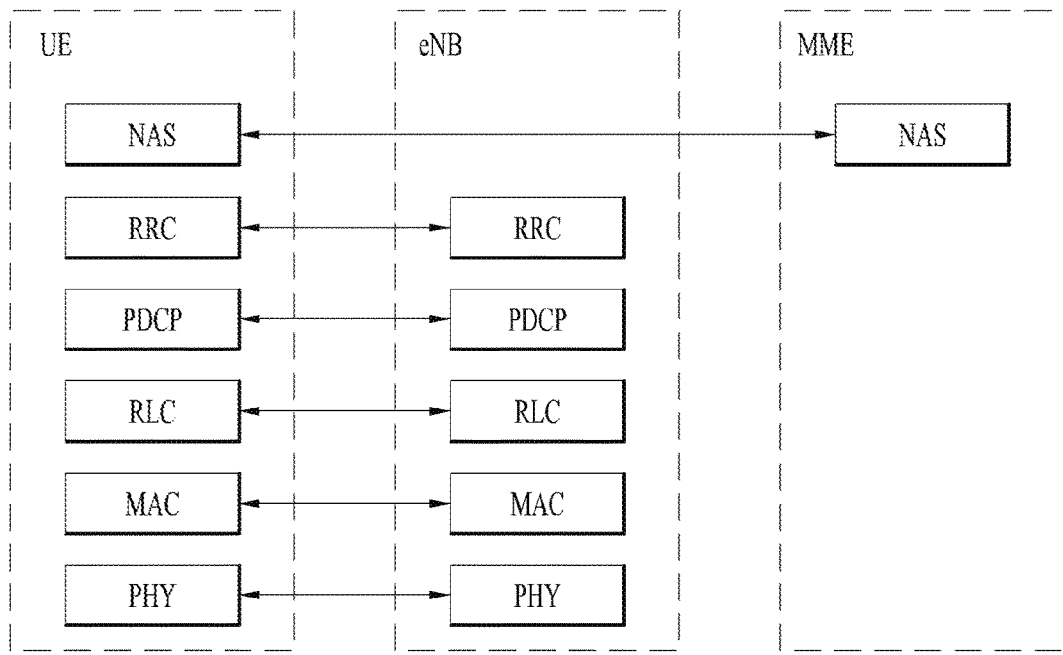
FIG. 3 illustrates the configurations of a radio interface protocol between the E-UTRAN and a UE.
Figure 3:
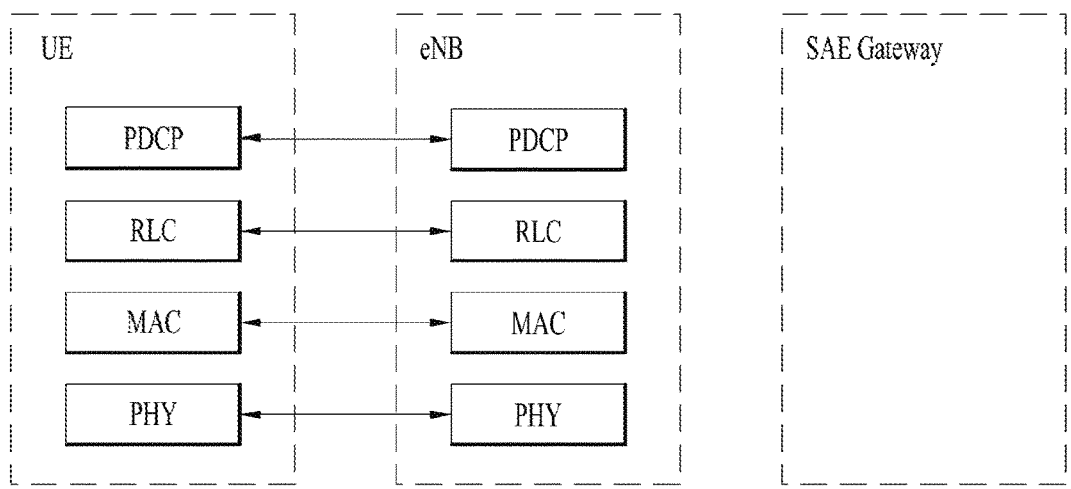

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management.

One cell of the eNB is set to use a bandwidth such as 1.25, 2.5, 5, 10 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Initial Access Procedure

The initial access procedure may be configured with a cell search procedure, a system information acquisition procedure and a random access procedure.

Figure 4:
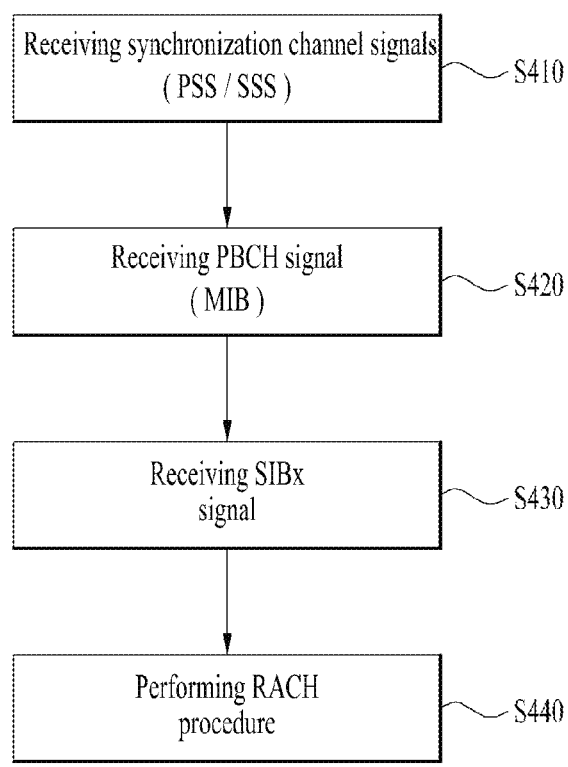
FIG. 4 illustrates one of examples of the initial access procedure used in LTE/LTE-A systems.

FIG. 4 illustrates one of examples of the initial access procedure used in LTE/LTE-A systems.

UE may acquire downlink synchronization information by receiving a Primary Synchronization Signal (PSS) and a Secondary Synchronization Signal (SSS) which are transmitted from the eNB. The synchronization signals are transmitted twice every frame unit. That is, the synchronization signals are transmitted at every 5 ms (S410).

A Physical Cell ID (PCID), downlink time and frequency synchronization information, and length information of cyclic prefix (CP) may be included in the synchronization signals at step S410.

And then, the UE receives Physical Broadcast Channel (PBCH) signals transmitted through a PBCH. In this case, the PBCH signals are repeatedly transmitted 4 times by using different scrambling sequences each other during 4 frames (i.e., 40 ms).

The PBCH signals includes Master Information Block (MIB) which is one of system information. One MIB is configured with 24 bits and 14 bits of them are used for representing physical HARQ indication channel (PHICH) configuration information, downlink cell bandwidth (dl-bandwidth) information, and a System Frame Number (SFN). The rest 10 bits can be configured as reserved bits.

After then, the UE is able to acquire other system information by receiving individual System Information Block (SIB)s transmitted from the eNB. The SIBs are transmitted on DL-SCH, and it is checked that whether the SIBs exist or not by receiving PDCCH signals masked with System Information Radio Network Temporary Identities (SI-RNTI).

System Information Block type 1 (SIB1) of SIBs includes parameters necessary for deciding the cell is suitable for a sell selection or not and time domain scheduling information (e.g., scheduling information list) for the other SIBs. SIB2 includes common channel information and shared channel information. SIB3 to SIB8 includes cell reselection related information, Inter-Frequency information, and/or Intra-Frequency information. SIB9 is used for transferring a name of a Home eNodeB (HeNB), and SIB10-SIB12 includes warning messages for an Earthquake and Tsunami Warning Service (ETWS) and a Commercial Mobile Alert System (CMSA). Lastly, SIB13 includes control information related to MBMS.

The UE is able to perform the random access procedure after performing steps S410 to S430. Especially, the UE may acquire parameters for transmitting Physical Random Access Channel (PRACH) by receiving the SIB2 from above described SIBs. Accordingly, the UE is able to perform the random access procedure with the eNB by generating and transmitting the PRACH signal based on the parameters included in the SIB2.

1.3 PWS in 3GPP Systems

Figure 5:
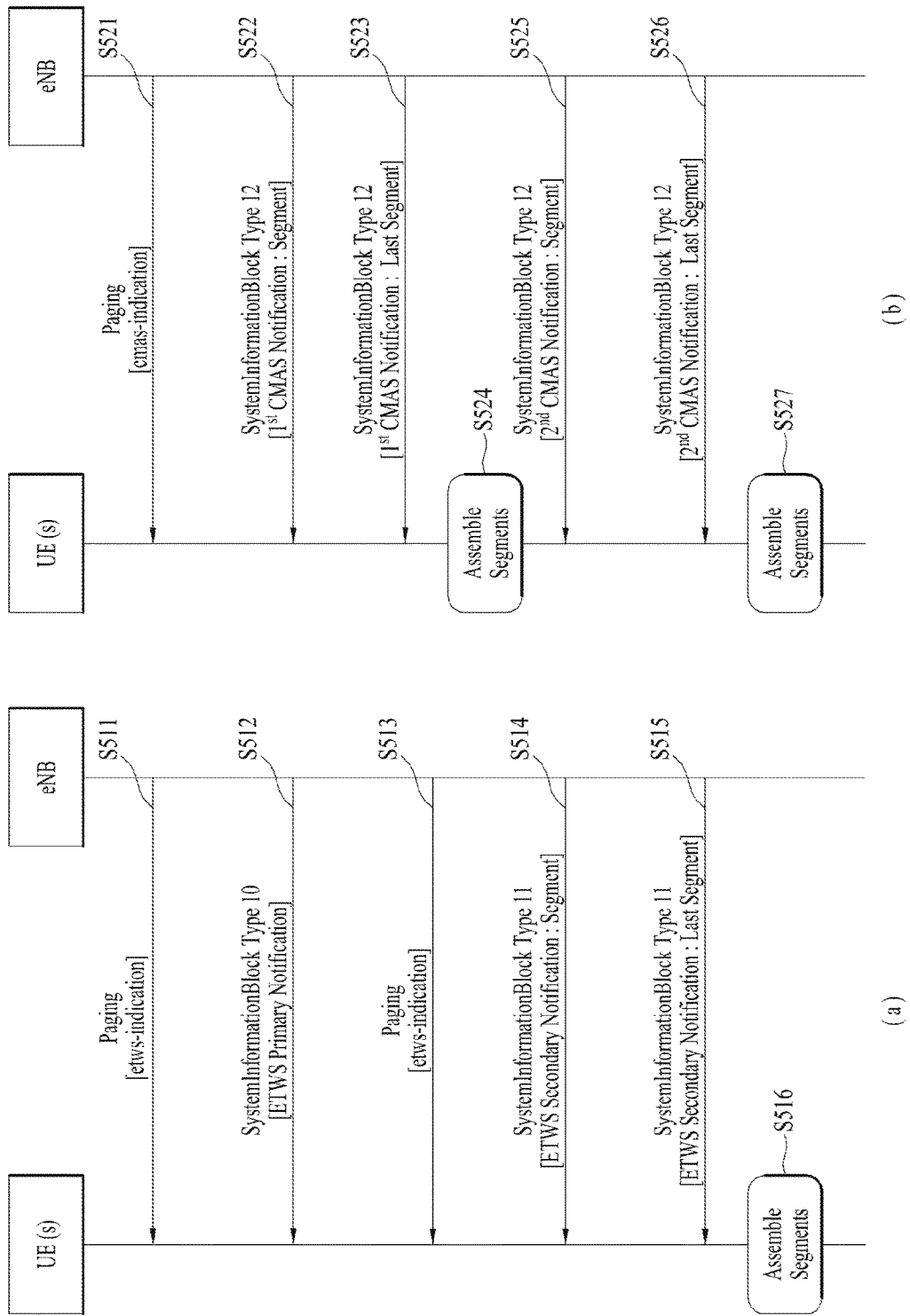
FIG. 5 illustrates examples of public warning notifications used in LTE/LTE-A systems.

FIG. 5 illustrates examples of public warning notifications used in LTE/LTE-A systems.

The delivery of types of Warning Notifications (e.g., an Earthquake and Tsunami Warning System (ETWS) and a Commercial Mobile Alert System (CMAS)) is triggered by the paging message sent from eNB to UE's in affected areas. The flows of the delivery mechanism(s) for the public warning notifications for ETWS and CMAS are depicted in FIGS. 5(a) and 5(b), respectively.

Hereinafter, the ETWS notification procedure is described based on FIG. 5(a). ETWS primary notification and/or ETWS secondary notification can occur at any point in time. The Paging message is used to inform ETWS capable UEs in RRC_IDLE state and in RRC_CONNECTED states about presence of an ETWS primary notification and/or ETWS secondary notification (S511 and S513).

If the UE receives a Paging message including the etws-Indication, it shall start receiving the ETWS primary notification and/or ETWS secondary notification according to scheduling information list (i.e., schedulingInfoList field) contained in SystemInformationBlockType1 message (i.e., SIB1). If the UE receives Paging message including the etws-Indication while it is acquiring ETWS notification(s), the UE shall continue acquiring ETWS notification(s) based on the previously acquired schedulingInfoList until it re-acquires schedulingInfoList in SystemInformationBlockType1 (not shown).

The scheduling information list field in the SIB1 is a sequence of scheduling informations. In this case, the scheduling information includes a sib-mapping information field (i.e., a sib-MappingInfo field) indicating list of the SIBs mapped to this system information message and a system information message periodicity field (i.e., a si-Periodicity field) indicating a periodicity of the SI-messages in radio frame. Accordingly, the UE of the present invention is able to receive the SIBs based on the schedulingInfoList in the SIB1.

ETWS primary notification is contained in SystemInformationBlockType10 message (i.e., SIB10) and ETWS secondary notification is contained in SystemInformationBlockType11 message (i.e., SIB11). Segmentation can be applied for the delivery of a secondary notification. The segmentation is fixed for transmission of a given secondary notification within a cell (i.e. the same segment size for a given segment with the same parameters such as, messageIdentifier, serialNumber and warningMessageSegmentNumber). In this case, an ETWS secondary notification may correspond to a single CB data IE as defined according to 3GPP TS 23.041 document (S512, S514, and S515).

After receiving the system information block type 11 at the steps S514 and S515, the UE assembles the segments of the ETWS secondary notification and acquires the ETWS notification (S516). In this case, the ETWS secondary notifications are optional information, so the ETWS secondary notifications can be omitted according to the contents of the public safety information.

In addition, the UE is not required to periodically check schedulingInfoList contained in SIB1, but Paging message including the etws-Indication triggers the UE to re-acquire schedulingInfoList contained in SIB1 for scheduling changes for SIB10 and SIB11. The UE may or may not receive a Paging message including the etws-Indication and/or systemInfoModification when ETWS is no longer scheduled.

Hereinafter, the CMAS notification procedure is described based on FIG. 5(b). The CMAS notification can occur at any point in time. The Paging message is used to inform CMAS capable UEs in RRC_IDLE state and in RRC_CONNECTED state about presence of one or more CMAS notifications (S521).

If the UE receives a Paging message including the cmas-Indication, it shall start receiving the CMAS notifications according to schedulingInfoList contained in SIB1. If the UE receives Paging message including the cmas-Indication while it is acquiring CMAS notification(s), the UE shall continue acquiring CMAS notification(s) based on the previously acquired schedulingInfoList until it re-acquires schedulingInfoList in SIB1.

For transmitting the CMAS notification, segmentation can be applied for the delivery of a CMAS notification. The segmentation is fixed for transmission of a given CMAS notification within a cell (i.e. the same segment size for a given segment with the same parameters such as, messageIdentifier, serialNumber and warningMessageSegmentNumber). E-UTRAN does not interleave transmissions of CMAS notifications, i.e. all segments of a given CMAS notification transmission are transmitted prior to those of another CMAS notification. A CMAS notification corresponds to a single CB data IE as defined according to TS 23.041. In this case, the at least one CMAS notification segments is contained in SystemInformationBlockType12 message (i.e., SIB12) (S522, S523, S525, and S526).

The UE tries to assemble the segments of the $1^{st}$ CMAS notification received at the steps of S522 and S523. If the assembled CMAS notification segments fulfills the CMAS notification, the UE does not needed to acquire further CMAS notification. However if the assembled CMAS notification segment does not fulfill, the UE tries to further receive the $2^{nd}$ CMAS notification segments at the steps S525 and S526 and assembles the second CMAS notification segments (S524 and S527).

The UE is not required to periodically check schedulingInfoList contained in SIB1, but Paging message including the cmas-Indication triggers the UE to re-acquire schedulingInfoList contained in SIB1 for scheduling changes for SIB12. The UE may or may not receive a Paging message including the cmas-Indication and/or systemInfoModification when SIB12 is no longer scheduled.

2. MBSP Procedure

The methods described hereinafter may be performed based on the techniques explained above section 1. Accordingly, steps, components or entities which will be not apparently explained can be referred to techniques of section 1.

The purpose of the MBSP procedures which will be described is to provide scenarios and use cases where a public safety agency in executing its mission, needs to distribute on a large scale timely public safety information to the public where this public safety information significantly exceeds the current PWS basic message capacity. Also to propose potential requirements for handling this dissemination via broadcast including the management of the public safety multimedia information broadcast and the access to this broadcast public safety multimedia information by the users. The present invention will consider this public safety multimedia broadcast capability as an enhancement or extension to the current PWS, and not consider it as a replacement of the current PWS.

Hereinafter, scenarios and use cases to provide public safety multi-media information in PWS which exceeds current PWS message capacity will be specifically described. In addition, the UE awareness of, and ability to receive, this multi-media public safety information via PWS will be increased and handling of UEs in limited service mode will be enhanced.

In the present invention, the use of the term 'broadcast' is an application terminology referring to the delivery of content to many users. Accordingly, it does not signify the use of any specific transmission mechanism and the present invention does not define potential requirements for specific PWS based systems (e.g., ETWS, CMAS, EU-ALERT, and Korean Public Alert System).

2.1 Terminologies

Hereinafter, terminologies for the embodiments of the present invention will be explained. A term defined in the present invention takes precedence over the definition of the same term in 3GPP TR 21.905 document. However, the terms do not defined in this document can be referred to 3GPP TR 21.905 document if the terms are the same.

A MBSP means a multimedia broadcast to supplement PWS. In this case, a MBSP message is a message sent from an Mobile Network Operator (MNO) to a UE and the MBSP message contains multimedia components (i.e., the multimedia information, essential public safety information) such as maps, images, live news video broadcasts, public safety information video broadcasts, evacuation information, latest safety briefings, weather warnings, emergency shelter locations, and assembly points etc.

An mPWS message is a message sent by a Public Safety agency to the MNO in order for an MNO to create the MBSP message. So, the mPWS message includes multimedia content also. The Public Safety agency is an any agency that is responsible for the protection of the safety of the general public from significant danger, harm, or damage. Examples include Law enforcement agencies, firefighters, and first responders.

ETWS or CMAS is one of PWSs that delivers warning notifications provided by warning notification providers to CMAS capable UEs or ETWS capable UEs.

In embodiment of the present invention, a message identifier field (i.e., messageIdentifier) indicates a source and type of ETWS/CMAS/PWS notification, a serial Number field (i.e., serialNumber) identifies variations of an ETWS/CMAS/PWS notification, and a warning message segment number field (i.e., warningMessageSegmentNumber) indicates segment number of segments of ETWS/CMAS/PWS notification.

2.2 Paging Messages

The Paging messages which may be applied to the MBSP procedures of the present invention are described hereinafter.

The following Tables 1 and 2 are proposed paging messages of a binary indication type and an enumerative indication type, respectively.

TABLE 1

```
-- ASN1START
Paging ::=                       SEQUENCE {
    pagingRecordList                 PagingRecordList            OPTIONAL,   -- Need ON
    systemInfoModification           ENUMERATED {true}           OPTIONAL,   -- Need ON
    etws-Indication                  ENUMERATED {true}           OPTIONAL,   -- Need ON
    nonCriticalExtension             Paging-v890-IEs             OPTIONAL
}
Paging-v890-IEs ::=              SEQUENCE {
    lateNonCriticalExtension         OCTET STRING                OPTIONAL,
    nonCriticalExtension             Paging-v920-IEs             OPTIONAL
}
Paging-v920-IEs ::=              SEQUENCE {
    cmas-Indication-r9               ENUMERATED {true}           OPTIONAL,   -- Need ON
    nonCriticalExtension             Paging-v1130-IEs            OPTIONAL
}
Paging-v1130-IEs ::=             SEQUENCE {
    eab-ParamModification-r11        ENUMERATED {true}           OPTIONAL,   -- Need ON
    nonCriticalExtension             Paging- v1xNNN -IEs         OPTIONAL
}
Paging-v1xNNN-IEs ::=            SEQUENCE {
    mbsp-Indication-r1x              ENUMERATED {true}           OPTIONAL,   -- Need ON
    nonCriticalExtension             SEQUENCE { }                OPTIONAL
}
PagingRecordList ::=             SEQUENCE (SIZE (1..maxPageRec)) OF PagingRecord
PagingRecord ::=                 SEQUENCE {
    ue-Identity                      PagingUE-Identity,
    cn-Domain                        ENUMERATED {ps, cs},
    ...
}
PagingUE-Identity ::=            CHOICE {
    s-TMSI                           S-TMSI,
    imsi                             IMSI,
    ...
}
IMSI ::=                         SEQUENCE (SIZE (6..21)) OF IMSI-Digit
IMST-Digit ::=                   INTEGER (0..9)
-- ASN1STOP
```

TABLE 2

```
-- ASN1START
Paging ::=                       SEQUENCE {
    pagingRecordList                 PagingRecordList            OPTIONAL,   -- Need ON
    systemInfoModification           ENUMERATED {true}           OPTIONAL,   -- Need ON
    etws-Indication                  ENUMERATED {true}           OPTIONAL,   -- Need ON
    nonCriticalExtension             Paging-v890-IEs             OPTIONAL
}
Paging-v890-IEs ::=              SEQUENCE {
    lateNonCriticalExtension         OCTET STRING                OPTIONAL,
    nonCriticalExtension             Paging-v920-IEs             OPTIONAL
}
```

TABLE 2-continued

```
Paging-v920-IEs ::=          SEQUENCE {
    cmas-Indication-r9           ENUMERATED {true}        OPTIONAL,   -- Need ON
    nonCriticalExtension         Paging-v1130-IEs         OPTIONAL
}
Paging-v1130-IEs ::=         SEQUENCE {
    eab-ParamModification-r11    ENUMERATED {true}        OPTIONAL,   -- Need ON
    nonCriticalExtension         Paging- v1xNNN -IEs                  OPTIONAL
}
Paging-v1xNNN-IEs ::=        SEQUENCE {
    mbsp-Indication-r1x          ENUMERATED {
                                 text, image, audio, video, spare1, spare2,
                                 spare3, spare4 }         OPTIONAL,   -- Need ON
    nonCriticalExtension         SEQUENCE { }             OPTIONAL
}
ENUMERATED {
                                 reconfigurationFailure, handoverFailure,
                                 otherFailure, spare1}
PagingRecordList ::=         SEQUENCE (SIZE (1..maxPageRec)) OF PagingRecord
PagingRecord ::=             SEQUENCE {
    ue-Identity                  PagingUE-Identity,
    cn-Domain                    ENUMERATED {ps, cs},
    ...
}
PagingUE-Identity ::=        CHOICE {
    s-TMSI                       S-TMSI,
    imsi                         IMSI,
    ...
}
IMSI ::=                     SEQUENCE {SIZE (6..21)) OF IMSI-Digit
IMSI-Digit ::=               INTEGER (0..9)
-- ASN1STOP
```

One of the paging messages is used for the notification of one or more UEs. The paging message is transmitted from an E-UTRAN to UE via paging control channel (PCCH).

Referring to Table 1 and 2, the etws-Indication field can be included in the paging message. If the etws-Indication field is included in the paging message, the etws-Indication field indicates an ETWS primary notification and/or an ETWS secondary notification will be transmitted.

In addition, cmas-Indication field can be included in the paging message. If the cmas-Indication field is included in the paging message, the cmas-Indication field indicates a CMAS notification will be transmitted.

Besides, referring to the Tables 1 and 2, the paging-v1xNNN-IE can be included in the paging message. The paging-v1xNNN-IE includes an mbsp-Indication field and a nonCriticalExtentsion field. The mbsp-Indication field indicates a present of the MBSP notification which includes MBSP-related information. The MBSP-related information will be explained hereinafter.

The paging message of Table 1 is the binary indication type. That is, the mbsp-Indication field is set to 1 bit for indicating whether the MBSP notification is present or not. On the other hand, the paging message of Table 2 is the enumerative indication type. In this case, the meaning of the "Enumerative Indication" is that the indication of the type of multimedia information by choosing one of the preconfigured/listed items. Accordingly, the mbsp-Indication field is able to be set with more than 2 bits so that it can indicate a type of the multimedia information for the MBSP. The following Table 3 shows examples of the MSBP indication types.

TABLE 3

| MBSP Indication Type | | Example Use case; If present, it means (see below) |
|---|---|---|
| mbsp-Indication-type0 | ENUMERATED {true} | e.g. for text-type message indication |

TABLE 3-continued

| MBSP Indication Type | | Example Use case; If present, it means (see below) |
|---|---|---|
| mbsp-Indication-type1 | ENUMERATED {true} | e.g. for image-type message indication |
| mbsp-Indication-type2 | ENUMERATED {true} | e.g. for audio-type message indication |
| mbsp-Indication-type3 | ENUMERATED {true} | e.g. for video-type message indication |
| ... | ... | ... |

The following table 4 describes paging fields included in the paging messages of the present invention.

TABLE 4

Paging field descriptions cmas-Indication
If present: indication of a CMAS notification.
cn-Domain
Indicates the origin of paging.
eab-ParamModification
If present: indication of an EAB parameters (SIB14) modification.
etws-Indication
If present: indication of an ETWS primary notification and/or ETWS secondary notification.
mbsp-Indication
If present: indication of an MBSP notification.
imsi
The International Mobile Subscriber Identity, a globally unique permanent subscriber identity, see TS 23.003 [27]. The first element contains the first IMSI digit, the second element contains the second IMSI digit and so on.
systemInfoModification
If present: indication of a BCCH modification other than SIB10, SIB11, SIB12 and SIB14.
ue-Identity
Provides the NAS identity of the UE that is being paged.

The other fields or parameters of the paging field can be referred to TS 36.331 documents. That is, if a definite explanation is not described in the present invention, the other terminologies and functions of fields, parameters, and/or information elements can be referred to the TS 36.331 document.

In addition, "v1x" or "r1x" which is attached to the last part of fields or parameter indicates the version or release number of 3GPP system which supports the fields or the parameters.

In addition, on top of the proposed paging message compositions (i.e., Table 1 and 2), another set of combinations are possible, for example the used of multiple "mbsp-related indicators".

2.3 MBSP Notification Procedure

Figure 6:
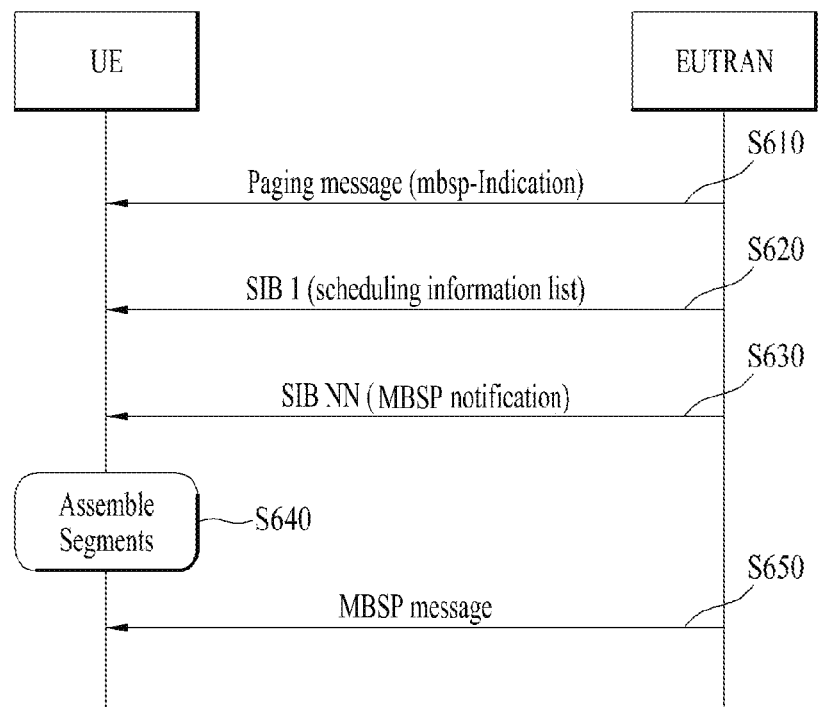
FIG. 6 illustrates one of examples of MBSP notification procedures.

FIG. 6 illustrates one of examples of MBSP notification procedures.

MBSP notification can occur at any point in time. The Paging message is used to inform MBSP-capable UEs in RRC_IDLE state and UEs in RRC_CONNECTED state about presence of one or more MBSP notifications.

Referring to FIG. 6, when an emergency situation has been occurred, the E-UTRAN transmits paging message including an mbsp-indication field to UE(s) which is located in a potential affected place or a dangerous place (S610).

If the UE receives a Paging message including the mbsp-Indication, it will start receiving the MBSP notifications according to scheduling information list (i.e., a schedulingInfoList field) contained in SIB1. To do so, the UE receives the SIB1 for acquiring the scheduling information list scheduling reception time of a SystemInformationBlockTypeNN message (i.e., SIB NN) including the MBSP notification (S620).

Base on the scheduling information list, the UE is able to receive the SIB NN containing MBSP notification. In this case, segmentation can be applied for the delivery of a MBSP notification. The segmentation is fixed for transmission of a given MBSP notification within a cell (i.e. the same segment size for a given segment with the same fields such as, messageIdentifier, serialNumber and warningMessageSegmentNumber). E-UTRAN does not interleave transmissions of MBSP notifications, i.e. all segments of a given MBSP notification transmission are transmitted prior to those of another MBSP notification. An MBSP notification corresponds to a single CB data IE as defined according to TS 23.041 document. Accordingly, if the segmentation has been applied, the UE receives one or more MBSP notification segments through SIB NN messages and assemble the segments for decoding the MSBP notification (S630 and S640).

However, if the segmentation has not been applied, the UE receives only one MBSP notification via the SIB NN.

In one aspect of the present invention, if the UE receives Paging message including the mbsp-Indication while it is acquiring MBSP notification(s), the UE shall continue acquiring MBSP notification(s) based on the previously acquired scheduling information list until it re-acquires new scheduling information list in new SIB1. For example, if new SIB1 is not transmitted at the step S620, the UE tries to receive SIB NN based on the scheduling information list which the UE has previously received via another SIB1. In addition, if the new SIB1 is transmitted at the step S620, the UE tries to receive the SIB NN according to the scheduling information list included in the new SIB1.

In another aspect of the present invention, the UE is not required to periodically check scheduling information list contained in SIB1, but Paging message including the mbsp-Indication triggers the UE to re-acquire scheduling information list contained in SIB1 for scheduling changes for SIB NN (NN: some number, which can be 11 or 12, or can be a new number (two new numbers), as opposed to the existing already-defined SIB's in 3GPP system, indicating a newly defined SIB dedicatedly for MBSP operations). The UE may or may not receive a Paging message including the mbsp-Indication and/or systemInfoModification when SIB NN is no longer scheduled.

Referring back to FIG. 6, after receiving and decoding the MBSP notification, the UE is able to acquire MBSP related information for receiving multimedia contents. Accordingly, the UE receives the MBSP message based on the MSBP related information (S650).

Figure 7:
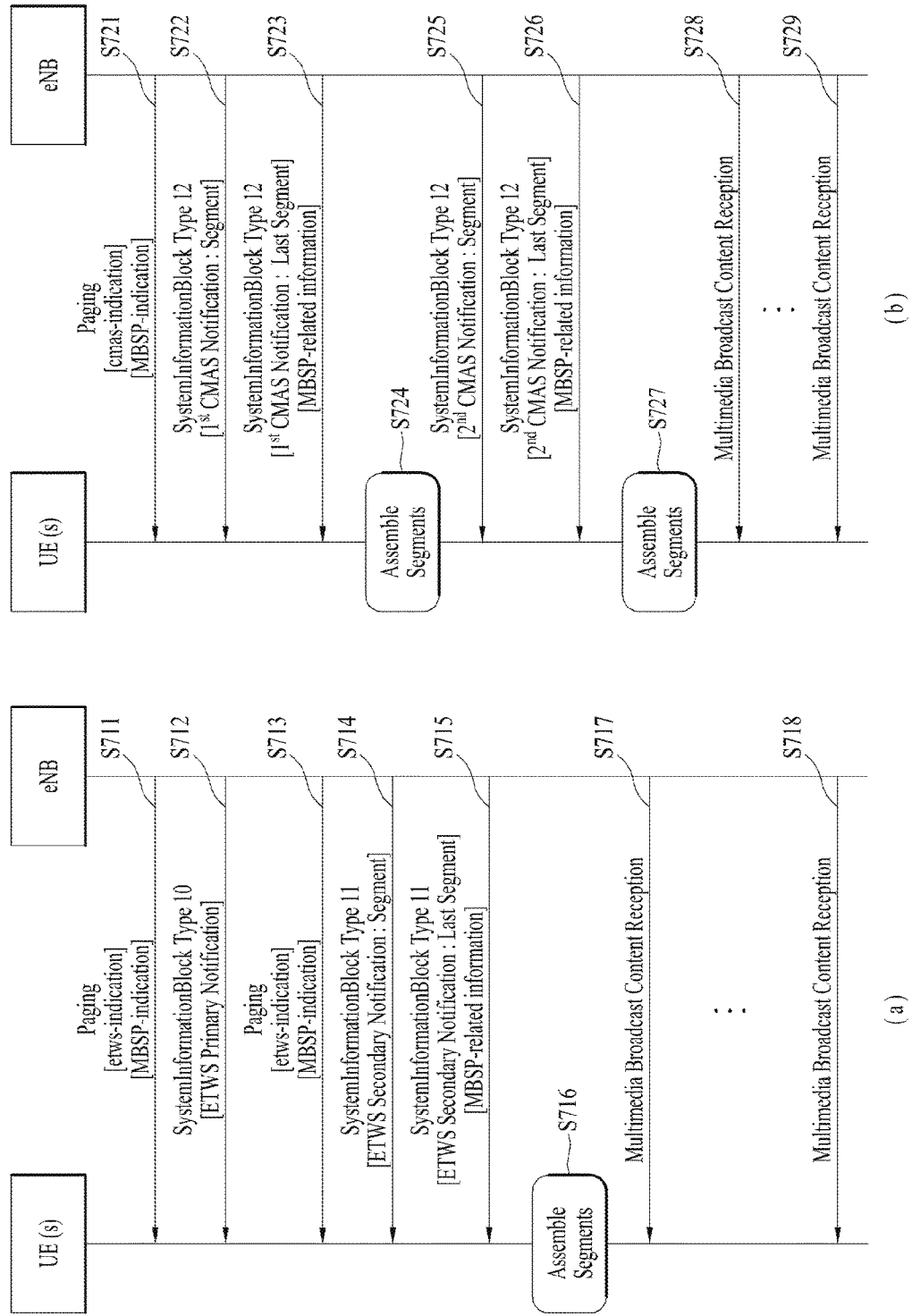
FIG. 7 illustrates methods based on existing protocol with revisions on a paging message, a SIB 11, and a SIB 12 for an MBSP notification procedure.

FIG. 7 illustrates methods based on existing protocol with revisions on a paging message, a SIB11, and a SIB12 for an MBSP notification procedure.

Indication of MBSP-enabled content can be delivered using paging signal. Resource-related information for multimedia content (included in a MBSP message) will be placed in the existing system information blocks such as a SystemInformationBlockType10 for a Primary Notification of ETWS, a SystemInformationBlockType11 for a Secondary Notification of ETWS and/or a SystemInformationBlockType12 for a Primary Notification of CMAS, etc.

FIG. 7(a) illustrates a MBSP notification procedure by utilizing ETWS secondary notification with suitable modification.

Referring to FIG. 7(a), when an emergency situation has been occurred, the E-UTRAN transmits paging message including an etws-indication field to UE(s) via eNB. In this case, the E-UTRAN transmits the paging messages to the UE(s) which is located in a potential affected place or a dangerous place (S711).

At the step S711, the etws-indication field indicates ETWS primary notification will be transmitted soon.

Upon receiving the Paging message, the UE which is ETWS capable may re-acquire SIB 1 including a scheduling information list, immediately. That is, the UE does not waiting until the next system information modification period boundary (not shown).

In this case, if the scheduling information list indicates that SIB 10 is present, the UE is able to acquire SIB 10 including the ETWS primary notification based on the scheduling information list (S712).

The E-UTRAN also transmits paging message including an etws-indication field and an mbsp-indication field to UE(s) via eNB. In this case, the E-UTRAN transmits the paging messages to the UE(s) which is located in a potential affected place or a dangerous place (S713).

At the step S713, the etws-indication field indicates ETWS secondary notification segments will be transmitted soon and the mbsp-indication field indicates MBSP notification (i.e., the MBSP-related information) will be transmitted.

In addition, if the scheduling information list indicates that SIB 11 is present, the UE is able to acquire SIB 11 including the ETWS secondary notification and MBSP-related information (i.e., the MBSP notification), if present (S714).

If the segmentation has been applied to the ETWS secondary notification, the UE may receive predetermined number of segments of the ETWS secondary notification included in the SIB 11s. At that time, the MBSP-related information is included along with the last segment of the ETWS secondary notification in the SIB 11 (S715).

Upon receiving the SIB 11, if this reading of SIB11 is triggered by the Paging message containing the mbsp-Indication (at step S713), the MBSP-capable UE tries to find an additional Text message field in the SIB 11. If "additional Text message field" is included in the SIB 11, the UE may discard the primary Text message (the one for Rel-12 and prior releases as of 2014.08) and display additional text message to the user or the UE may display the primary Text message (the one for Rel-12 and prior releases as of 2014.08) and an additional Text message to the user. In the present invention, the additional Text message is used for extending the size of the legacy text message (i.e., the first text message or the primary text message).

In addition, if this reading of SIB11 is triggered by the Paging message containing the mbsp-Indication (at step S713), the MBSP-capable UE tries to find a resource assignment indication (for MBSP message reception) in the SIB 11. That is, the UE tries to find the MBSP-related information for the MBSP message reception. If the MBSP-related information exists in the SIB 11, the UE is able to read the indicated resources to acquire MBSP message(s)

If the segmentation has been applied, the UE may assemble the segments in order to find and decode the MBSP-related information (S716). However, if the segmentation has not been applied the step S716 can be omitted.

The MBSP-related information includes scheduling information for allocating the resources for the MBSP message(s). The scheduling information includes a frame number field indicating a frame, a subframe number indicating a subframe where the MBSP message will be transmitted in the frame, an extension field indicating how many subframes are used for reliable delivery (i.e., for repetition) and/or a resource block (BR) index indicating the starting and ending RB indices if more than one RB is used.

Accordingly, the UE(s) is able to receive the MBSP message(s) including multimedia public safety information on the MBSP-related information (S717, S718).

FIG. 7(b) illustrates a MBSP notification procedure by utilizing CMAS notification with suitable modification.

Referring to FIG. 7(b), when an emergency situation has been occurred, the E-UTRAN transmits paging message including a cmas-indication field and an mbsp-indication field to UE(s) via eNB. In this case, the E-UTRAN transmits the paging messages to the UE(s) which is located in a potential affected place or a dangerous place (S721).

Upon receiving the Paging message, the UE which is CMAS capable may re-acquire SIB 1 including a scheduling information list, immediately. That is, the UE does not waiting until the next system information modification period boundary (not shown).

In this case, if the scheduling information list indicates that SIB 12 is present, the UE is able to acquire one or more SIB 12s including $1^{st}$ CMAS notification segments and/or $2^{nd}$ CMAS notification segments based on the scheduling information list (S722, S723, S725, and S726).

If the reading of the one or more SIB 12s is triggered by the paging message including the mbsp-indication, the UE tries to find an additional Text message field in the SIB 12. If the additional Text message is included in the SIB 12, the UE is able to discard the primary Text message and display the addition Text message or the UE is able to display the primary Text message and the additional Text message.

In addition, if the reading of the one or more SIB 12s is triggered by the paging message including the mbsp-indication, the UE tries to find the MBSP-related information in the SIB 12. In this case, the MBSP-related information can be included along with the last segment of the $1^{st}$ CMAS notification and/or the last segment of the $2^{nd}$ CMAS notification in the SIB 12.

In addition, if this reading of SIB12 is triggered by the Paging message containing the mbsp-Indication (at step S721), the MBSP-capable UE tries to find a resource assignment indication for MBSP message reception. That is, the UE tries to find the MBSP-related information for the MBSP message reception. If the MBSP-related information exists, the UE read the indicated resources to acquire MBSP message(s)

If the segmentation has been applied, the UE may assemble the segments in order to find and decode the CMAS Notifications and/or the MBSP-related information (S724, S727). However, if the segmentation has not been applied the step S724 and S727 can be omitted.

The MBSP-related information may include scheduling information for transmitting/receiving the MBSP message. The scheduling information includes a frame number field indicating a frame, a subframe number indicating a subframe where the MBSP message will be transmitted in the frame, an extension field indicating how many subframes are used for reliable delivery (i.e., for repetition) and/or a resource block (BR) index indicating the starting and ending RB indices if more than one RB is used.

Accordingly, the UE(s) is able to receive the MBSP message(s) including multimedia public safety information (S728, S729).

Figure 8:
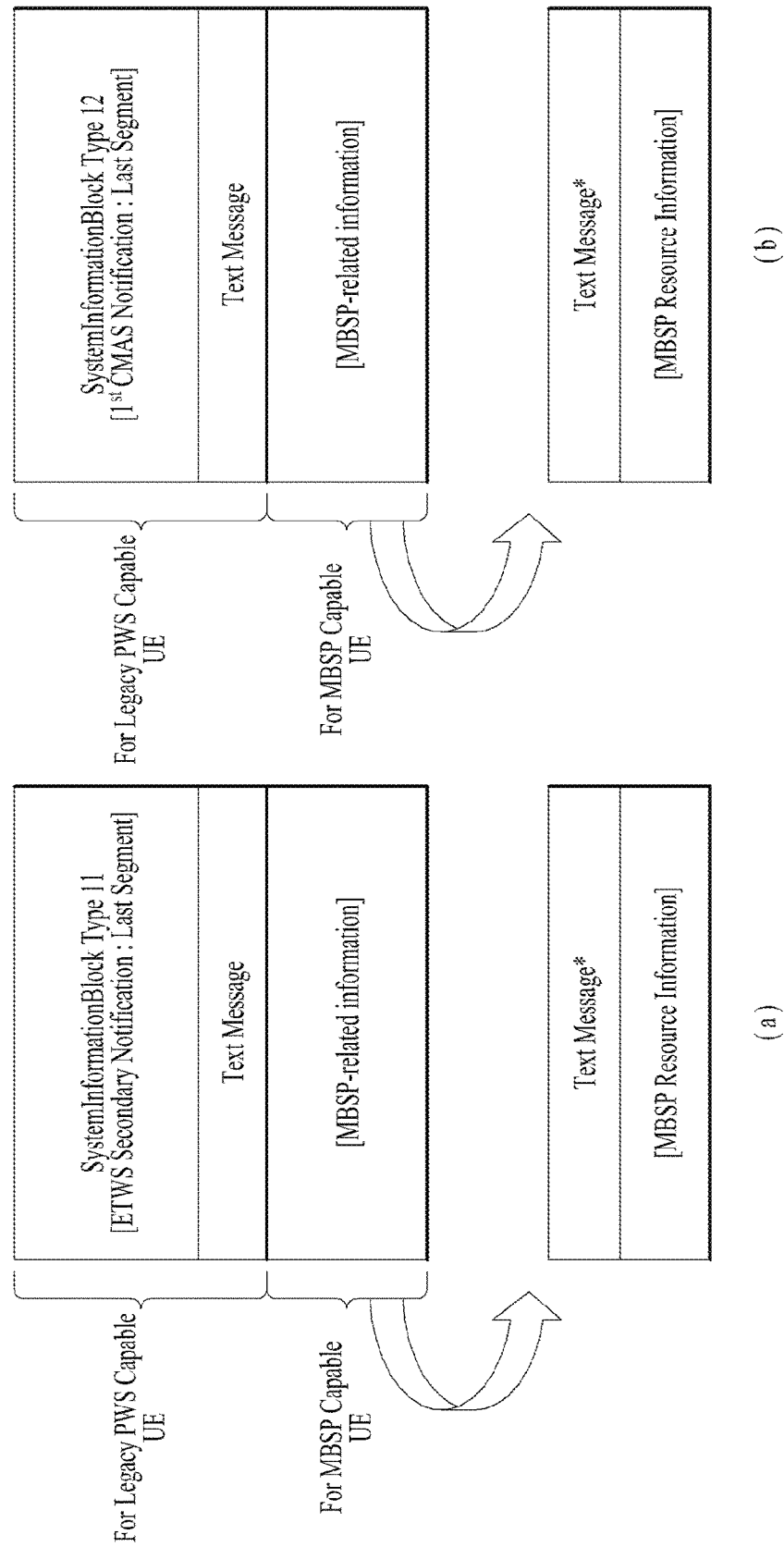
FIG. 8 illustrates structures of SIB 11 and SIB 12 according to embodiments of the present invention.

FIG. 8 illustrates structures of SIB 11 and SIB 12 according to embodiments of the present invention.

Referring to FIG. 8(a), the SIB 11 containing the last segment of the ETWS Secondary Notification also includes a first text message (i.e., the legacy text message or the primary text message), MBSP-related information, a second text message (i.e., an additional text message), and/or MBSP resource information. The last segment of the ETWS secondary Notification and the first text message can be decodable for legacy PWS capable UEs. However, the MBSP-related information, the second text message and the MBSP resource information are only decodable for MBSP capable UE Referring to FIG. 8(b), the SIB 12 containing the last segment of the ETWS Secondary Notification also includes a first text message, MBSP-related information, a second text message (i.e., an additional text message), and/or MBSP resource information. The last segment of the ETWS secondary Notification and the first text message can be decodable for legacy PWS capable UEs. However, the MBSP-related information, the second text message and the MBSP resource information are only decodable for MBSP capable UE An aspect of the embodiments of the present invention, if the MBSP capable UE decodes the MBSP related information in the SIB 11 or the SIB 12, the UE is able to decode the MBSP indication, the second Text message and the MBSP resource information according to the contents of the MBSP related information.

Another aspect of the embodiments of the present invention, the MBSP resource information is set as an optional field. So, if the MBSP related information includes scheduling information for the MBSP message, the MBSP resource information can be omitted.

In this case, the scheduling information includes a frame number field indicating a frame, a subframe number indicating a subframe where the MBSP message will be transmitted in the frame, an extension field indicating how many subframes are used for reliable delivery (i.e., for repetition)

and/or a resource block (BR) index indicating the starting and ending RB indices if more than one RB is used.

Figure 9:
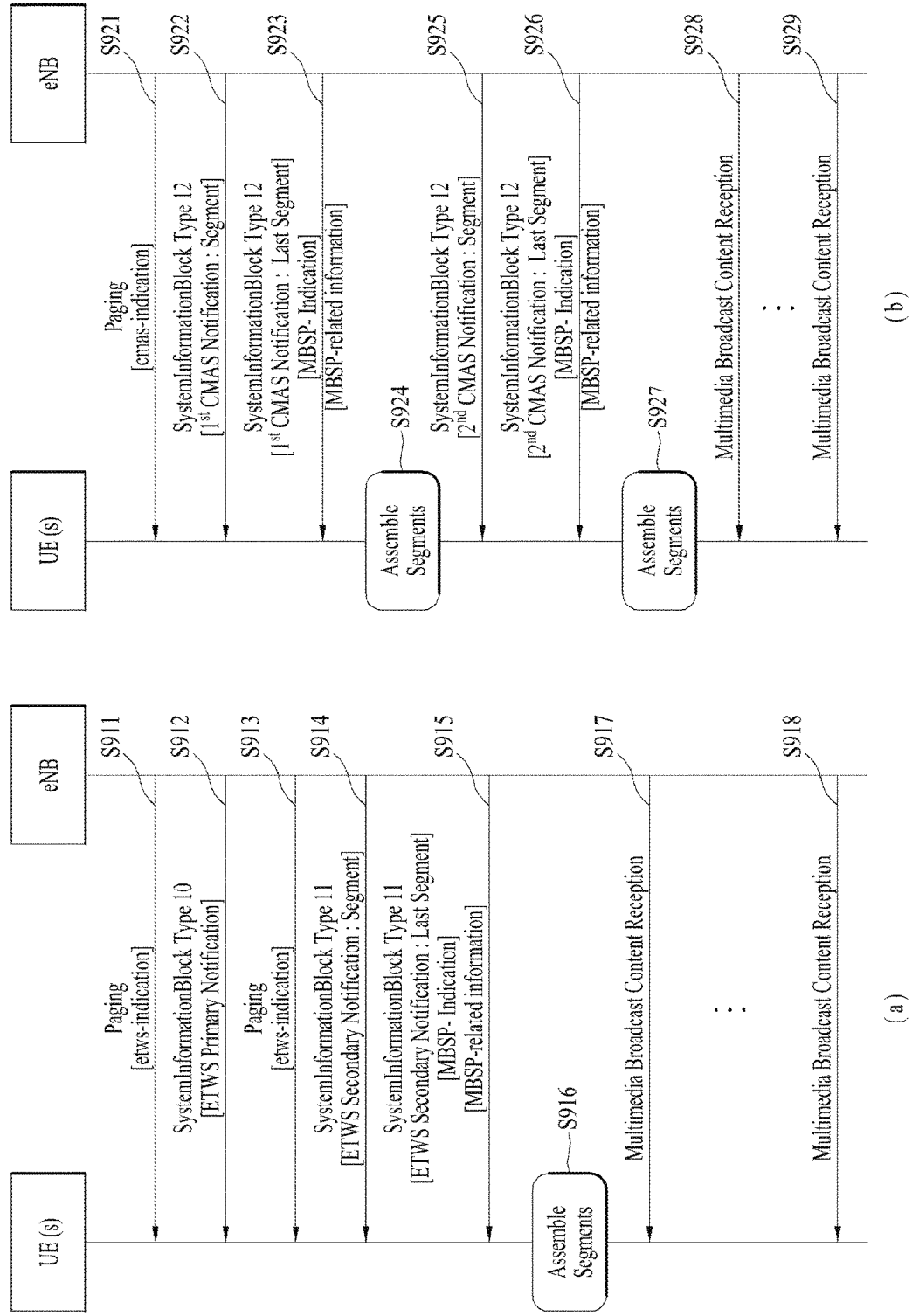
FIG. 9 illustrates methods based on existing protocol with revisions on a SIB 11 and a SIB 12 for an MBSP notification procedure.

FIG. 9 illustrates methods based on existing protocol with revisions on a SIB 11 and a SIB 12 for an MBSP notification procedure.

Indication of MBSP-enabled and resource-related information for multimedia content will be placed in the existing system information blocks such as a SIB 10 including a Primary Notification of an ETWS, a SIB 11 including a Secondary Notification of ETWS, or a SIB 12 including Primary Notification of a CMAS, etc.

FIG. 9(a) illustrates a MBSP notification procedure by utilizing an ETWS secondary notification with suitable modification.

Referring to FIG. 9(a), when an emergency situation has been occurred, the E-UTRAN transmits paging message including an etws-indication field to UE(s) via eNB. In this case, the E-UTRAN transmits the paging messages to the UE(s) which is located in a potential affected place or a dangerous place (S911).

At the step S911, the etws-indication field indicates ETWS primary notification will be transmitted soon.

Upon receiving the Paging message, the UE which is ETWS capable may re-acquire SIB 1 including a scheduling information list, immediately. That is, the UE does not waiting until the next system information modification period boundary (not shown).

In this case, if the scheduling information list indicates that SIB 10 is present, the UE is able to acquire SIB 10 including the ETWS primary notification based on the scheduling information list (S912).

The E-UTRAN also transmits paging message including an etws-indication field to UE(s) via eNB. In this case, the E-UTRAN transmits the paging messages to the UE(s) which is located in a potential affected place or a dangerous place (S913).

At the step S913, the etws-indication field indicates ETWS secondary notification segments will be transmitted.

If the segmentation has been applied to the ETWS secondary notification, the UE may receive predetermined number of segments of the ETWS secondary notification included in the SIB 1 is (S914 and S915).

At that time, the SIB 11 containing the last segment of the ETWS secondary notification further includes an mbsp-indication and MBSP-related information (S915).

Upon receiving the SIB 11 at step S915, if the mbsp-indication is included and the UE is ETWS capable and MBSP capable, the UE tries to find an additional Text message field in the SIB 11. If "additional Text message field" is included in the SIB 11, the UE may discard the primary Text message (the one for Rel-12 and prior releases as of 2014.08) and display additional text message to the user or the UE may display the primary Text message (the one for Rel-12 and prior releases as of 2014.08) and an additional Text message to the user.

In addition, if the mbsp-indication is included and the UE is ETWS capable and MBSP capable, the UE tries to find resource assignment indication for MBSP message reception. That is, the UE tries to find the MBSP-related information in the SIB 11 for the MBSP message reception. If the MBSP-related information exists, the UE read the indicated resources to acquire MBSP message(s).

If the segmentation has been applied, the UE may assemble the segments in order to find and decode the MBSP-related information (S916). However, if the segmentation has not been applied the step S916 can be omitted.

The MBSP-related information includes scheduling information for allocating the resources for the MBSP message(s). The scheduling information includes a frame number field indicating a frame, a subframe number indicating a subframe where the MBSP message will be transmitted in the frame, an extension field indicating how many subframes are used for reliable delivery (i.e., for repetition) and/or a resource block (BR) index indicating the starting and ending RB indices if more than one RB is used.

Accordingly, the UE(s) is able to receive the MBSP message(s) including multimedia public safety information based on the MBSP-related information (S917, S918).

FIG. 9(b) illustrates a MBSP notification procedure by utilizing CMAS notification with suitable modification.

Referring to FIG. 9(b), when an emergency situation has been occurred, the E-UTRAN transmits paging message including a cmas-indication field to UE(s) via eNB. In this case, the E-UTRAN transmits the paging message to the UE(s) which is located in a potential affected place or a dangerous place (S921).

Upon receiving the Paging message, the UE which is CMAS capable may re-acquire SIB 1 including a scheduling information list, immediately. That is, the UE does not waiting until the next system information modification period boundary (not shown).

In this case, if the scheduling information list indicates that SIB 12 is present, the UE is able to acquire one or more SIB 12s including $1^{st}$ CMAS notification segments and/or $2^{nd}$ CMAS notification segments based on the scheduling information list, respectively (S922, S923, S925, and S926).

Upon receiving the SIB 12 at step S923 or S926, if the mbsp-indication is included in the one of SIB 12s and the UE is CMAS capable and MBSP capable, the UE tries to find an additional Text message field in the SIB 12. If the additional Text message is included in the SIB 12, the UE is able to discard the primary Text message and display the addition Text message or the UE is able to display the primary Text message and the additional Text message.

In addition, if the mbsp-indication is included in the one of SIB 12s, the UE tries to find the MBSP-related information in the SIB 12. In this case, the MBSP-related information can be included along with the last segment of the $1^{st}$ CMAS notification and/or the last segment of the $2^{nd}$ CMAS notification in the SIB 12. If the MBSP-related information exists, the UE read the indicated resources to acquire MBSP message(s)

If the segmentation has been applied to the CMAS Notification, the UE may assemble the segments in order to find and decode the CMAS Notifications and/or the MBSP-related information (S924, S927). However, if the segmentation has not been applied, the step S924 and S927 can be omitted.

The MBSP-related information includes scheduling information for allocating the resources for the MBSP message(s). The scheduling information includes a frame number field indicating a frame, a subframe number indicating a subframe where the MBSP message will be transmitted in the frame, an extension field indicating how many subframes are used for reliable delivery (i.e., for repetition) and/or a resource block (BR) index indicating the starting and ending RB indices if more than one RB is used.

Accordingly, the UE(s) is able to receive the MBSP message(s) including multimedia public safety information (S928, S929).

Figure 10:
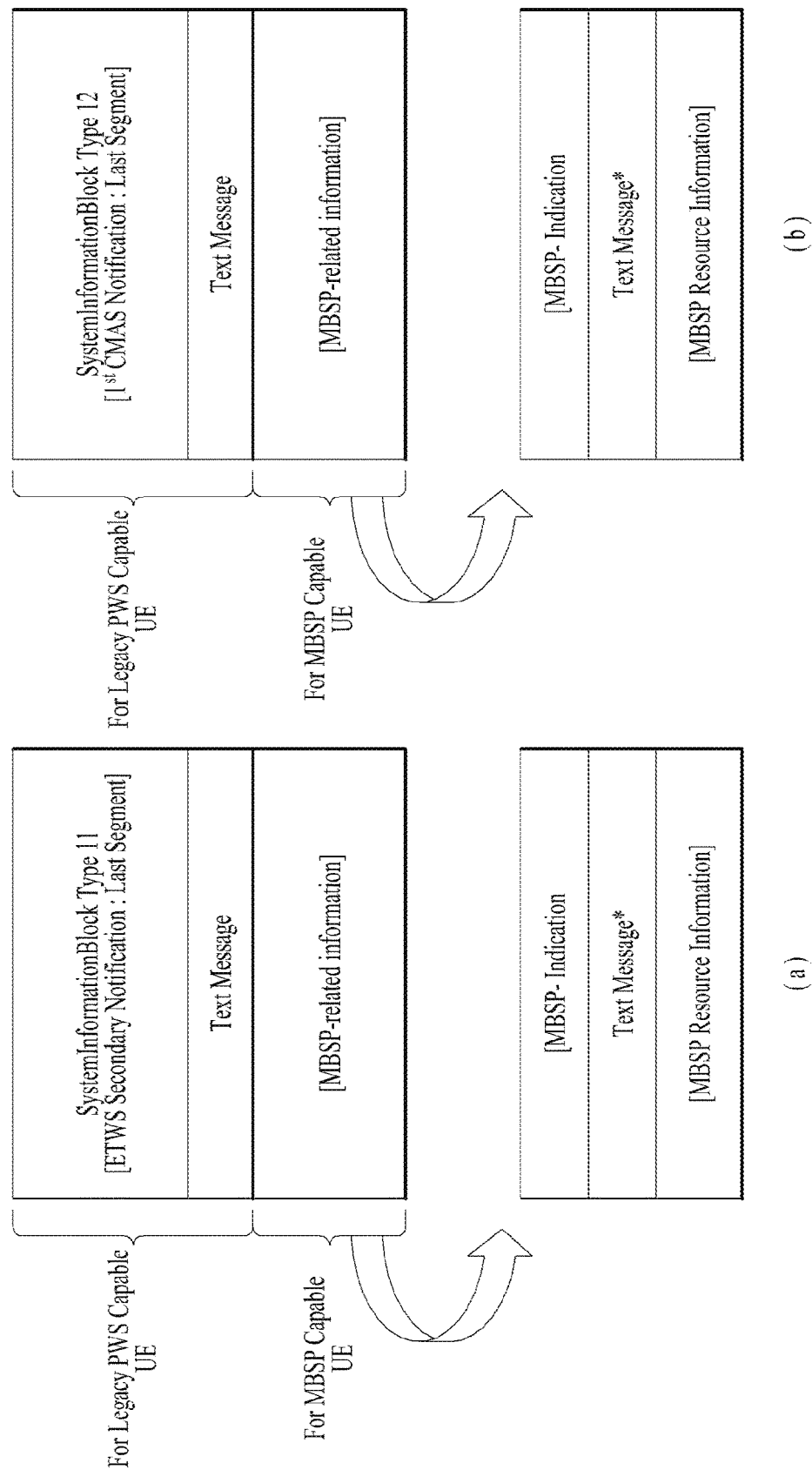
FIG. 10 illustrates structures of SIB 11 and SIB 12 according to embodiments of the present invention.

FIG. 10 illustrates structures of SIB 11 and SIB 12 according to embodiments of the present invention.

Referring to FIG. 10(a), the SIB 11 containing the last segment of the ETWS Secondary Notification also includes a first text message (i.e., the legacy text message, the primary text message), MBSP-related information, a MBSP indication, a second text message (i.e., an additional text message), and/or MBSP resource information. The last segment of the ETWS secondary Notification and the first text message can be decodable for legacy PWS capable UEs. However, the MBSP-related information, the MBSP indication, the second text message and the MBSP resource information are only decodable for MBSP capable UE.

Referring to FIG. 10(b), the SIB 12 containing the last segment of the ETWS Secondary Notification also includes a first text message, MBSP-related information, a MBSP indication, a second text message (i.e., an additional text message), and/or MBSP resource information. The last segment of the ETWS secondary Notification and the first text message can be decodable for legacy PWS capable UEs. However, the MBSP-related information, the MBSP indication, the second text message and the MBSP resource information are only decodable for MBSP capable UE.

An aspect of the embodiments of the present invention, if the MBSP capable UE decodes the MBSP related information in the SIB 11 or the SIB 12, the UE is able to decode the MBSP indication, the second Text message and the MBSP resource information according to the contents of the MBSP related information.

Another aspect of the embodiments of the present invention, the MBSP resource information is set as an optional field. So, if the MBSP related information includes scheduling information for the MBSP message, the MBSP resource information can be omitted.

In this case, the scheduling information includes a frame number field indicating a frame, a subframe number indicating a subframe where the MBSP message will be transmitted in the frame, an extension field indicating how many subframes are used for reliable delivery (i.e., for repetition) and/or a resource block (BR) index indicating the starting and ending RB indices if more than one RB is used.

Figure 11:
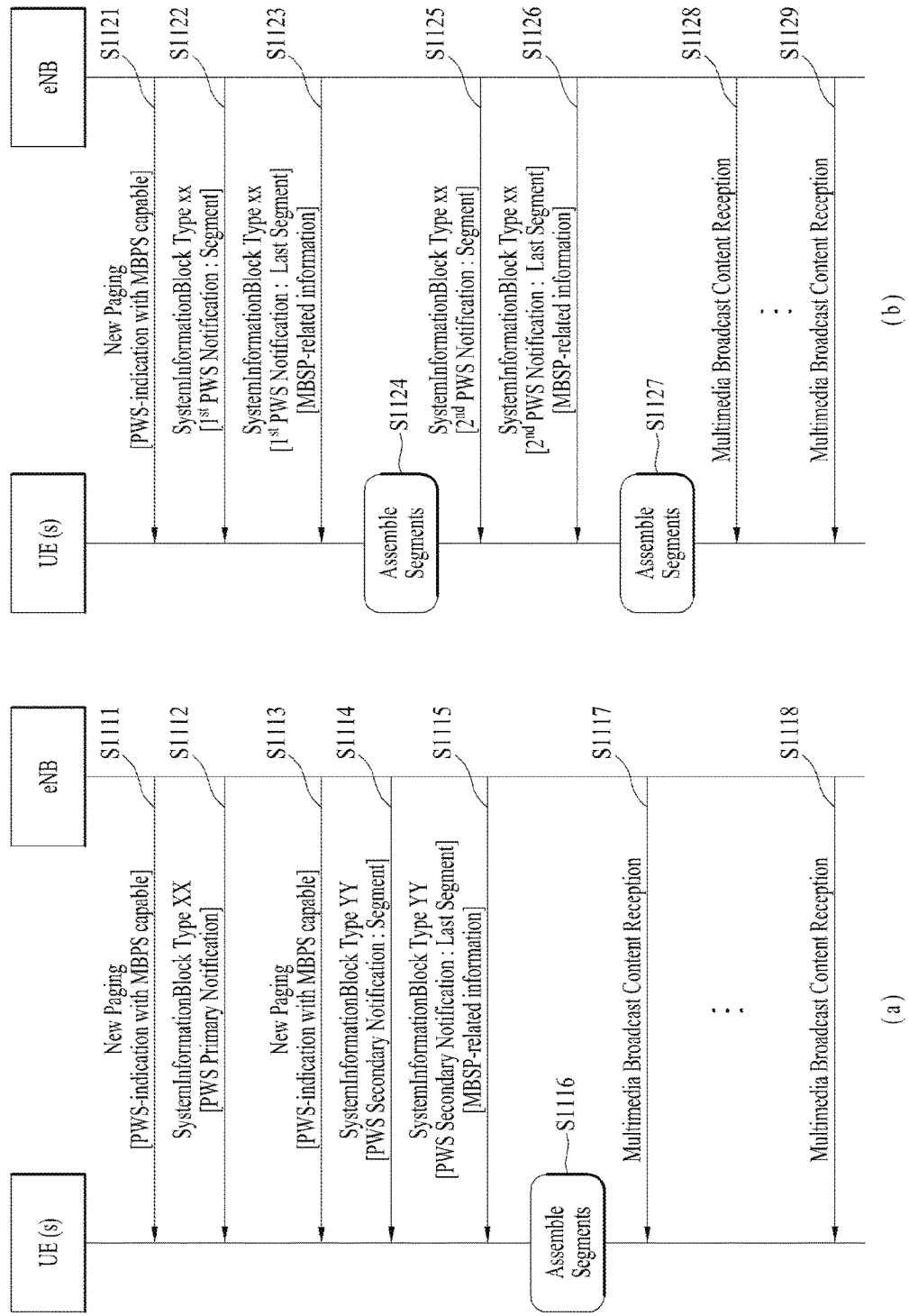
FIG. 11 illustrates methods of MBSP notification procedures by using new paging message and new SIBs.

FIG. 11 illustrates methods of MBSP notification procedures by using new paging message and new SIBs.

Regarding to methods explained hereinafter, indication of MBSP-enabled content may be delivered using a new paging signal. Resource-related information for multimedia content will be placed in a new system information blocks such as SIB XX for Primary Notification of MBSP and/or SIB YY for Secondary Notification of MBSP, etc.

FIG. 11(a) illustrates a MBSP notification procedure by using two SIBs.

Referring to FIG. 11(a), when an emergency situation has been occurred, the E-UTRAN transmits new paging message including an mbsp-indication field (i.e., PWS-indication with MBSP capable) to UE(s) via eNB. In this case, the E-UTRAN transmits the paging messages to the UE(s) which is located in a potential affected place or a dangerous place (S1111).

At the step S1111, the mbsp-indication field indicates PWS primary notification will be transmitted soon.

Upon receiving the Paging message, the UE which is MBSP capable may re-acquire SIB 1 including a scheduling information list, immediately. That is, the UE does not waiting until the next system information modification period boundary (not shown).

In this case, if the scheduling information list indicates that SIB XX is present, the UE is able to acquire SIB XX including the PWS Primary notification based on the scheduling information list (S1112).

Upon receiving the SIB XX at step S1112, if the mbsp-indication (i.e., the PWS-indication with MBSP capable) is included in the paging message and the UE is MBSP capable, the UE tries to find an additional Text message field in the SIB XX. If "additional Text message field" is included in the SIB XX, the UE may discard the primary Text message (the one for Rel-12 and prior releases as of 2014.08) and display additional text message to the user or the UE may display the primary Text message (the one for Rel-12 and prior releases as of 2014.08) and an additional Text message to the user.

The E-UTRAN also transmits new paging message including an mbsp-indication field to UE(s) via eNB (S1113).

Upon receiving the Paging message, the UE which is MBSP capable may re-acquire SIB 1 including a scheduling information list, immediately. That is, the UE does not waiting until the next system information modification period boundary (not shown).

At the step S1113, the mbsp-indication field indicates PWS secondary notification segments and MBSP notification will be transmitted. If the scheduling information list indicates that the SIB YY is present, the UE tries to acquire the SIB YYs including segments of the PWS secondary notification. If the segmentation has been applied to the PWS secondary notification, the UE may receive predetermined number of segments of the PWS secondary notification included in the SIB YYs (S1114 and S1115).

At that time, the SIB YY containing the last segment of the PWS secondary notification further includes MBSP-related information (i.e., the MBSP notification).

If the mbsp-indication is included in the paging message and the UE is MBSP capable, the UE tries to find resource assignment indication (i.e., MBSP-related information) for MBSP message reception. When the MBSP-related information exists, the UE read the indicated resources by the MBSP-related information to acquire MBSP message(s).

If the segmentation has been applied, the UE may assemble the segments in order to find and decode the MBSP-related information (S1116). However, if the segmentation has not been applied the step S1116 can be omitted.

The MBSP-related information includes scheduling information for allocating the resources for the MBSP message(s). The scheduling information includes a frame number field indicating a frame, a subframe number indicating a subframe where the MBSP message will be transmitted in the frame, an extension field indicating how many subframes are used for reliable delivery (i.e., for repetition) and/or a resource block (BR) index indicating the starting and ending RB indices if more than one RB is used.

Accordingly, the UE(s) is able to receive the MBSP message(s) including multimedia public safety information based on the MBSP-related information (S1117, S1118).

FIG. 11(b) illustrates a MBSP notification procedure by using a single SIB.

Referring to FIG. 11(b), when an emergency situation has been occurred, the E-UTRAN transmits new paging message including an mbsp-indication field (i.e., PWS-indication with MBSP capable) to UE(s) via eNB. In this case, the E-UTRAN transmits the paging messages to the UE(s) which is located in a potential affected place or a dangerous place (S1121).

At the step S1121, the mbsp-indication field indicates a $1^{st}$ PWS notification will be transmitted soon.

Upon receiving the Paging message, the UE which is MBSP capable may re-acquire SIB 1 including a scheduling information list, immediately. That is, the UE does not waiting until the next system information modification period boundary (not shown).

In this case, if the scheduling information list indicates that SIB NN is present, the UE is able to acquire SIB NNs including segments of the $1^{st}$ PWS notification and/or $2^{nd}$ PWS notification based on the scheduling information list (S1122, S1123, S1125, and S1126).

The UE tries to assemble the $1^{st}$ PWS notification segments received at steps S1122 and S1123 (S1124). If the assembled PWS notification segments fulfills the PWS notification, the UE does not needed to acquire further CMAS notification. In this case, the steps S1125 to S1127 can be omitted. However, if the assembled PWS notification segments does not fulfill, the UE tries to further receive segments of the $2^{nd}$ PWS notification and assemble the $2^{nd}$ PWS notification segments (S1127).

Upon receiving the SIB NNs at step S1123 or S1126, if the mbsp-indication is included in the new paging message and the UE is MBSP capable, the UE tries to find an additional Text message field in the SIB NNs. If the additional Text message is included in the SIB NNs, the UE is able to discard the primary Text message and display the addition Text message or the UE is able to display the primary Text message and the additional Text message.

In addition, if the mbsp-indication is included in the new paging message, the UE tries to find the MBSP-related information in the SIB NN. In this case, the MBSP-related information can be included along with the last segment of the $1^{st}$ PWS notification and/or the last segment of the $2^{nd}$ PWS notification in the SIB NN. If the MBSP-related information exists, the UE read the indicated resources to acquire MBSP message(s)

If the segmentation has been applied to the PWS Notification, the UE may assemble the segments in order to find and decode the PWS Notifications and/or the MBSP-related information (see, S1124, S1127). However, if the segmentation has not been applied, the step S1124 and S1127 can be omitted.

The MBSP-related information includes scheduling information for allocating the resources for the MBSP message(s). The scheduling information includes a frame number field indicating a frame, a subframe number indicating a subframe where the MBSP message will be transmitted in the frame, an extension field indicating how many subframes are used for reliable delivery (i.e., for repetition) and/or a resource block (BR) index indicating the starting and ending RB indices if more than one RB is used.

Accordingly, the UE(s) is able to receive the MBSP message(s) including multimedia public safety information (S1128, S1129).

In the above embodiments, the "addition Text message field" is used for extending the size of the primary Text message for legacy PWS in order to display longer text to user. That is, for supporting larger size than the legacy text message, the addition text message can be included in the SIB 10, 11, 12, or NN messages. In addition, the paging messages depicted in FIGS. 6, 7, 9, and 11 can be referred to the paging message of Table 1 or Table 2.

3. Apparatuses for Implementing the Aforementioned Methods

FIG. 12 shows apparatuses for implementing the above-mentioned methods described with reference to FIGS. 1 to 11.

A UE can serve as a transmitting end on uplink and as a receiving end on downlink. An eNB can serve as a receiving end on uplink and as a transmitting end on downlink.

The UE and the eNB may include transmitter 1240 and 1250 and receiver 1260 and 1270 for controlling transmission and reception of signal, data and/or messages and antennas 1200 and 1210 for transmitting and receiving signal, data and/or messages, respectively. In this case, the UE may further include a screen to display user information such as a current time, a battery state, an event occurrence history, weather, and/or multimedia contents etc.

In addition, the UE and the eNB may respectively include processors 1220 and 1230 for performing the above-described embodiments of the present invention and memories 1270 and 1290 for storing processing procedures of the processors temporarily or continuously. For example, the processor of the UE is configured to receive the paging message and the SIB messages by controlling the receiver. In addition, the processor of the UE is able to decode the paging message and the SIB messages and acquire the mbsp-indication and mbsp notification (i.e., the mbsp-related information). Accordingly, the processor of the UE may receive the MBSP messages based on the scheduling information included in the SIB messages. The processor of the eNB is configured to support the transmission of the paging message, SIB messages and the MBSP messages. The detail of the embodiments of the present application can be referred to sections 1 to 2 as disclosed above.

The embodiments of the present invention can be performed using the aforementioned components and functions of the UE and the eNB. The transmitter 1240 and 1250 and the receiver 1260 and 1270 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) unit.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

The invention claimed is:

1. A method for receiving a multimedia broadcast supplement for public warning system (MBSP) message, the method performed by a user equipment (UE) and comprising:
receiving a paging message including notification information that an MBSP notification will be transmitted;
receiving a system information block including the MBSP notification, wherein the MBSP notification includes MBSP related information for allocating a resource for receiving the MBSP message; and
receiving the MBSP message through the resource,
wherein the MBSP message includes public safety multimedia information for warning a user of the UE, and
wherein the system information block further includes a second text message which is used for extending a size of a first text message of a legacy public warning system (PWS).

2. The method according to claim 1, wherein the UE is an MBSP capable UE and the paging message is only applicable to the MBSP capable UE.

3. The method according to claim 1, further comprising:
receiving another system information block including a scheduling information list with reception time for the system information block including the MBSP notification.

4. The method according to claim 1, wherein the system information block including the MBSP notification is a system information block 11 which is used for transmitting an Earthquake and Tsunami Warning Service (ETWS) notification.

5. The method according to claim 1, wherein the system information block including the MBSP notification is a system information block 12 which is used for transmitting a Commercial Mobile Alert System (CMAS) notification.

6. A user equipment (UE) for receiving a multimedia broadcast supplement for public warning system (MBSP) message, the UE comprising:
a receiver; and
a processor, functionally connected with the receiver,
wherein the processor is configured to control the receiver to:
receive a paging message including notification information that an MBSP notification will be transmitted;
receive a system information block including the MBSP notification, wherein the MBSP notification includes MBSP related information for allocating a resource for receiving the MBSP message; and
receive the MBSP message through the resource,
wherein the MBSP message includes public safety multimedia information for warning a user of the UE, and
wherein the system information block further includes a second text message which is used for extending a size of a first text message of a legacy public warning system (PWS).

7. The UE according to claim 6, wherein the UE is an MBSP capable UE and the paging message is only applicable to the MBSP capable UE.

8. The UE according to claim 6, wherein the processor further controls the receiver to receive another system information block including a scheduling information list with reception time for the system information block including the MBSP notification.

9. The UE according to claim 6, wherein the system information block including the MBSP notification is a system information block 11 which is used for transmitting an Earthquake and Tsunami Warning Service (ETWS) notification.

10. The UE according to claim 6, wherein the system information block including the MBSP notification is a system information block 12 which is used for transmitting a Commercial Mobile Alert System (CMAS) notification.

* * * * *